(12) United States Patent
Allison

(10) Patent No.: US 9,908,465 B2
(45) Date of Patent: Mar. 6, 2018

(54) PORTABLE TRAFFIC INCIDENT SCREEN

(71) Applicant: Donna Allison, Hendersonville, NC (US)

(72) Inventor: Donna Allison, Hendersonville, NC (US)

( * ) Notice: Subject to any disclaimer, the term of this patent is extended or adjusted under 35 U.S.C. 154(b) by 0 days.

(21) Appl. No.: 14/934,747

(22) Filed: Nov. 6, 2015

(65) Prior Publication Data

US 2017/0167091 A1 Jun. 15, 2017

Related U.S. Application Data

(60) Provisional application No. 62/077,563, filed on Nov. 10, 2014.

(51) Int. Cl.
| | |
|---|---|
| *E01F 9/00* | (2016.01) |
| *B60Q 7/00* | (2006.01) |
| *E01F 7/00* | (2006.01) |
| *E01F 9/688* | (2016.01) |
| *E01F 9/692* | (2016.01) |
| *E01F 13/02* | (2006.01) |

(52) U.S. Cl.
CPC ............... *B60Q 7/00* (2013.01); *E01F 7/00* (2013.01); *E01F 9/688* (2016.02); *E01F 9/692* (2016.02); *E01F 13/02* (2013.01)

(58) Field of Classification Search
CPC ... E01F 9/692; E01F 9/70; E01F 13/02; E01F 13/022; E01F 13/028
USPC ........................................................ 160/351
See application file for complete search history.

(56) References Cited

U.S. PATENT DOCUMENTS

| | | | | | |
|---|---|---|---|---|---|
| 2,571,382 | A | * | 10/1951 | Raven | G03B 21/58 160/351 |
| 2,855,037 | A | * | 10/1958 | Stiffel | F16B 12/02 15/268 |
| 3,207,206 | A | * | 9/1965 | Braddon | G03B 21/58 160/24 |
| 3,219,301 | A | * | 11/1965 | Robinson | A47F 5/04 206/216 |
| 3,223,387 | A | * | 12/1965 | Magliocco | E01F 13/02 116/63 P |
| 3,591,116 | A | * | 7/1971 | Dalum | F16M 11/24 211/195 |
| 3,841,631 | A | * | 10/1974 | Dolan | A63B 71/023 108/15 |
| 3,917,231 | A | * | 11/1975 | Fink | E01F 13/028 256/1 |
| 4,124,196 | A | * | 11/1978 | Hipskind | E01F 7/00 116/63 P |
| 4,134,439 | A | * | 1/1979 | Scott | A47G 5/00 160/135 |

(Continued)

*Primary Examiner* — Katherine W Mitchell
*Assistant Examiner* — Johnnie A. Shablack
(74) *Attorney, Agent, or Firm* — Joseph T. Guy; Patent Filing Specialist, Inc.

(57) ABSTRACT

A portable free-standing traffic incident screening assembly of flexible fabric (tarp, screen, etc.) stretched between at least two stanchions, each stanchion having at least three adjustable legs, flexible telescoping vertical extension portions, and removable ballast. The portable screens defend incident sites by establishing privacy, reduce the probability of secondary accidents due to an unprotected scene, and provide a secure environment for incident investigators.

17 Claims, 4 Drawing Sheets

(56) References Cited

U.S. PATENT DOCUMENTS

| | | | | |
|---|---|---|---|---|
| 4,186,912 | A * | 2/1980 | Byrd, Jr. | E01F 7/00 116/63 P |
| 4,201,975 | A * | 5/1980 | Marcus | E01F 9/658 116/63 C |
| 4,717,103 | A * | 1/1988 | Kester | F16M 11/38 248/125.1 |
| 4,770,086 | A * | 9/1988 | Gabster | E21F 1/14 160/350 |
| 4,792,258 | A * | 12/1988 | Goff | E01F 13/02 116/63 P |
| 4,859,983 | A * | 8/1989 | Kulp | E01F 13/02 116/63 P |
| 4,993,719 | A * | 2/1991 | Hernandez | A63B 61/02 273/298 |
| 5,020,764 | A * | 6/1991 | Yamamoto | E04H 12/2246 248/529 |
| 5,178,356 | A * | 1/1993 | Schouwey | A63B 5/20 160/236 |
| 5,207,260 | A * | 5/1993 | Commesso | B60P 7/135 160/135 |
| 5,402,988 | A * | 4/1995 | Eisele | E01F 13/022 160/351 |
| 5,402,999 | A * | 4/1995 | Keehn, Sr. | A63B 71/023 160/135 |
| 5,426,577 | A * | 6/1995 | Gordin | E04H 12/24 174/45 R |
| 5,460,353 | A * | 10/1995 | Rittenhouse | A63B 71/028 160/135 |
| 5,875,597 | A * | 3/1999 | Gingrich | A47G 5/02 160/135 |
| 6,036,249 | A * | 3/2000 | Kuntz | B60Q 7/00 160/135 |
| 6,142,701 | A * | 11/2000 | Falcon | E01F 13/028 160/24 |
| 6,406,002 | B1 * | 6/2002 | Hardy, III | E01F 13/022 256/23 |
| 6,619,610 | B1 * | 9/2003 | Genovese | E04H 12/2246 135/118 |
| 6,702,482 | B2 * | 3/2004 | Sherwin | F16M 11/34 248/168 |
| 6,733,204 | B1 * | 5/2004 | Paniccia | E01F 7/06 160/238 |
| 6,807,999 | B1 * | 10/2004 | Bowen | E01F 13/028 160/24 |
| 6,969,185 | B1 * | 11/2005 | Adair | B60Q 7/00 160/10 |
| 6,976,807 | B2 * | 12/2005 | King | E02B 3/06 405/26 |
| 6,986,496 | B2 * | 1/2006 | Roberts | E01F 9/692 248/519 |
| 7,156,088 | B2 * | 1/2007 | Luconi | F24J 2/16 126/684 |
| 7,217,061 | B2 * | 5/2007 | Stratton | E01F 13/028 160/24 |
| 7,231,954 | B2 * | 6/2007 | Green | E01F 13/022 135/114 |
| 7,494,111 | B2 * | 2/2009 | Short | E01F 13/022 160/135 |
| 7,600,554 | B1 * | 10/2009 | Wright | E01F 7/00 160/327 |
| 7,614,600 | B1 * | 11/2009 | Smith | E04H 12/2246 135/16 |
| 7,721,748 | B2 * | 5/2010 | Dreamwalker | E04H 15/60 135/114 |
| 7,958,670 | B2 * | 6/2011 | Kamau | A01G 9/02 47/66.1 |
| 7,974,004 | B2 * | 7/2011 | Maruyama | G03B 21/58 160/351 |
| 8,091,605 | B1 * | 1/2012 | Melhart | G10K 11/20 160/135 |
| 8,322,666 | B2 * | 12/2012 | Duemmel | A45B 11/00 248/163.1 |
| 8,500,609 | B1 * | 8/2013 | Williams | A63C 11/228 135/65 |
| 8,505,867 | B2 * | 8/2013 | Conrad | F16M 11/04 248/159 |
| 8,631,755 | B2 * | 1/2014 | Klein | E01F 13/028 116/63 C |
| 8,714,174 | B1 * | 5/2014 | DeSousa | E04H 12/2246 135/117 |
| 8,902,076 | B2 * | 12/2014 | Pederson | G07C 9/00158 340/815.45 |
| 8,973,645 | B1 * | 3/2015 | Cannova | E01F 7/00 160/351 |
| 9,038,298 | B2 * | 5/2015 | Bacik | G09F 23/00 135/25.1 |
| 9,174,107 | B2 * | 11/2015 | Dettor | A63B 61/00 |
| 9,598,896 | B1 * | 3/2017 | Pichik | E06B 9/08 |
| 2007/0235068 | A1 * | 10/2007 | Green | E01F 13/022 135/114 |
| 2008/0283809 | A1 * | 11/2008 | Hoffman, Jr. | A63B 71/022 256/23 |
| 2010/0181544 | A1 * | 7/2010 | Wettern | E01F 13/028 256/73 |
| 2010/0288450 | A1 * | 11/2010 | Bruck | F16P 1/02 160/238 |
| 2013/0048227 | A1 * | 2/2013 | Cannova | E01F 13/028 160/10 |
| 2015/0176231 | A1 * | 6/2015 | Cannova | E01F 7/00 160/351 |

* cited by examiner

PORTABLE TRAFFIC INCIDENT SCREEN

CROSS-REFERENCE TO RELATED APPLICATIONS

The present application claims priority to U.S. Provisional Patent Application No. 62/077,563 filed Nov. 10, 2014 which is incorporated herein by reference.

BACKGROUND OF THE INVENTION

The present invention is related to a portable screen particularly suitable for providing a barrier inhibiting bystanders, particularly motorist, from visual inspection of an area, and more particularly a crash site or traffic incident.

In a recent report issued by the North Carolina Department of Transportation 'rubbernecking' is among the main causes of secondary traffic accidents and related injuries. First responders to accidents typically arrive quickly, but as the 'rubberneckers' pass by, the privacy and integrity of the incident scene is lost due to traffic congestion. Firefighters and EMS personnel are hampered from performing their duties safely and with confidence that the site is protected from unwanted intrusion. Such traffic congestion is characterized by slower speeds and longer trip times. In addition to accidents, causes of traffic congestion may include roadwork, or other construction, and increased congestion caused thereby.

Regardless of cause, traffic congestion can escalate and increase due to "gawking." Gawking occurs when drivers stuck in traffic slow down, despite nearing the cause or end of congestion, to observe what is going on. Often, this is to see a car accident, wreckage, and emergency response vehicles. Regardless, such gawking often magnifies the delays caused by the traffic congestion.

According to a 2003 study conducted by Virginia Commonwealth University, rubbernecking, driver fatigue and looking at scenery are some of the leading causes of distraction-related traffic crashes. The study, conducted for the Virginia Department of Motor Vehicles, may be one of the most comprehensive of its kind in the nation. More than 2,700 crash scenes involving distracted drivers and nearly 4,500 drivers were studied. While cell phones have been widely criticized as the cause of distracted driving, they ranked sixth in the study's list of distracted driving behaviors. Looking at traffic, crashes and roadside incidents was the primary distraction in 16 percent of the crashes studied, followed by driver fatigue, 12 percent; looking at scenery, 10 percent; passenger and child distractions, nine percent; and adjusting the radio, CD or tape player, seven percent. Cell phones were cited as the primary distraction in slightly more than five percent of the crashes studied. Distractions inside the vehicle accounted for 62 percent of all the crashes studied.

The Federal Highway Administration's "BEST PRACTICES IN TRAFFIC INCIDENT MANAGEMENT" recommends that incident investigation sites provide a safe refuge off the main roadway where further investigation or documentation, such as pictures and videos, can take place in a secure environment. Scene security screens should block unauthorized electronic surveillance. Sites should be easily accessible from the main roadway for authorized personnel and vehicles, yet sufficiently out of sight to prevent unauthorized surveillance and motorist delay caused by rubbernecking.

Increased congestion, due to gawking, has opportunity costs including non-productivity of drivers caught in lengthened commutes. Moreover, such delays can cause lost business, disciplinary action or other personal losses. Inability to forecast travel times can cause drivers to allocate more time to travel, again resulting in loss of productivity. This can also lead to increased wear and tear on vehicles. Finally, longer commutes due to gawking causes increased air pollution and carbon dioxide emissions.

While gawking continues to be a significant contributor to traffic congestion, very little has been done to alleviate this problem. One proposed solution is disclosed in Patent Publication No. U.S. 20130048227 to Cannova which teaches a portable barrier having three primary components: a first vertical assembly, a corresponding second vertical assembly and a retractable screen positioned between both vertical assemblies. Preferably, the retractable screen includes a plurality of perforations sufficient to reportedly allow enough air to pass through the portable barrier to reduce the risk of toppling the device during normal wind conditions. The perforations are contrary to the discovery of this invention wherein no perforations are necessary.

Patent Publication No. U.S. 20100288450 to Bruck teaches a septum (wall) apparatus having a plurality of fabric sheets connected to poles on tripods on each side. The role of the tripods is to keep the poles upright. Since the fabric sheets are exposed to wind, they act as sails, resulting in pushing the septum until it collapses. One embodiment of the invention adds a supporting rope to each side of the apparatus, connected to a grounded peg. Alternatively, each of the tripods has weights connected to the legs of the tripod. Neither ropes nor weighted legs are required for the current invention.

U.S. Pat. No. 7,600,554 to Wright teaches a portable accident barrier device with a pair of telescopic pole assemblies of substantially equal length, and a tarpaulin. The pole assemblies each have a base including a vertically-oriented cylindrical post having four cylindrical S-shaped ground-engaging feet affixed equidistantly apart to the post in a downwardly and outwardly relationship thereto and further having a locking means therein. The current invention is free-standing and does not use ground-engaging devices.

U.S. Pat. No. 4,124,196 entitled "Portable Device for Screening Off and Accident Scene from View" to Hipskind which addresses a perforated vinyl sheet that can be assembled between two vertical rods. Contrary to the current invention, the Hipskind device requires one vertical rod to be attached to an emergency vehicle positioned at the source of the congestion.

U.S. Pat. No. 6,142,701 entitled "Traffic Management System" to Falcon teaches use of three vertical posts, two of which include rolled and expandable screens that are dispensed by way of a crank. To ensure stability, the Falcon system however requires a middle vertical pole not required for the current invention.

Accordingly, there is a need in the art for portable screens that defend incident sites with respect by establishing privacy, reduce the probability of secondary accidents due to an unprotected scene, and provide a secure environment for incident investigators.

BRIEF SUMMARY OF THE INVENTION

It is an object of the current invention to provide a portable incident screening system that deploys and sets-up quickly, preferably in less than one minute.

Another object of the invention is to significantly reduce 'rubbernecking' that can lead to secondary accidents.

Yet another object of the invention is to provide adaptable screening configurations to easily conceal an incident site.

Yet another object of the invention is to provide a portable screening system that is easily stored in vehicle compartments for quick access.

Yet another object of the invention is to provide a stand-alone system that frees up responders to concentrate on more important tasks at the scene.

These and other advantages, as will be realized, are provided in a portable traffic incident screen system. The system comprises at least two stanchions and each stanchion further comprises a base having an annulus therein, a bottom section, a top section and wherein, as deployed, the base is elevated above ground. At least three adjustable length legs are rotatably disposed to the top section of the base. A telescoping vertical extension is slidingly disposed in the base wherein the vertical extension further comprises a flexible material portion. A ballast is removably disposable in the annulus of the base and a flexible fabric is removably disposed between the stanchions. The system has a stability ratio in the range of more than 0 to no more than 30 pounds per stanchion.

Yet another embodiment is provided in a portable traffic incident screen system. The system comprises at least two stanchions with each stanchion further comprising a base having an annulus therein, a bottom section, a top section and as deployed the base is elevated above ground. At least three adjustable length legs are rotatably disposed, or attached, to the top section of the base. A telescoping vertical extension is slidingly disposed in the base wherein the vertical extension further comprises a flexible material portion. A ballast is provided for removably disposing in the annulus of the base and a flexible fabric is removably disposed between the stanchions. The system has a stability ratio in the range of more than 0 to no more than 30 pounds per stanchion.

DETAILED DESCRIPTION OF THE INVENTION

The present invention is directed to a portable free-standing assembly of flexible fabric, such as a tarp, screen, etc., and to at least two stanchions, each stanchion having at least three adjustable legs, flexible telescoping vertical extension portions, and removable ballast in a stanchion annulus. The invention is designed to withstand turbulent wind shear forces typically caused by nearby traffic. The stanchions have a flexible telescoping vertical extension portion, a deployed base portion elevated off the ground, and a removable ballast in an annulus of the base for flexibility and stability during wind shear. The flexible stanchion extensions relieve wind tipping or heeling forces by allowing the geometry of the fabric to adjust in changing wind conditions thereby reducing the resultant wind force vectors on the fabric.

Figure 4:
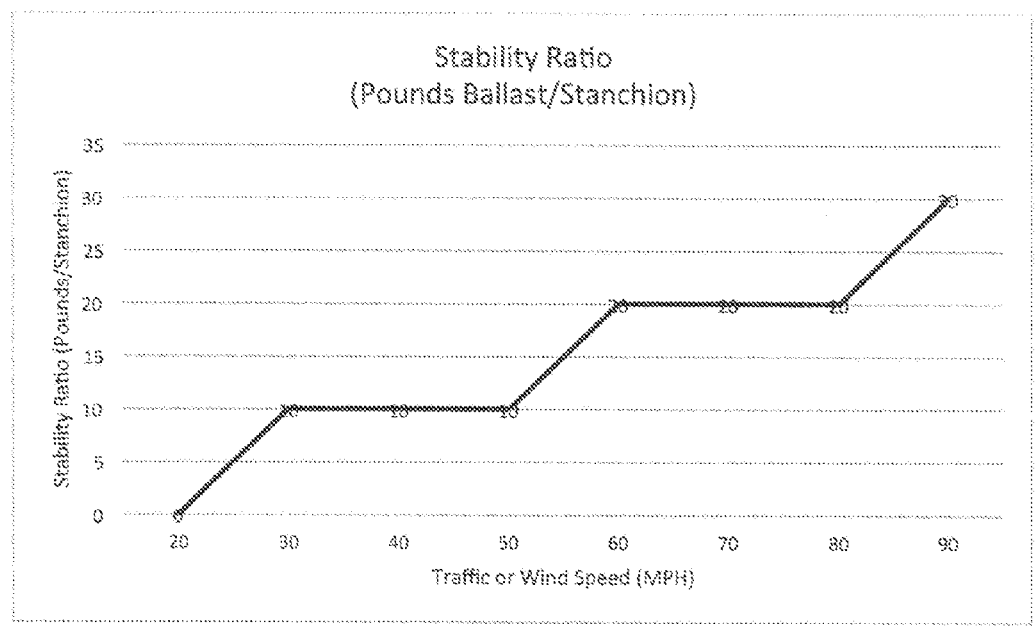
FIG. 4 is a graphical representation of the stability ratio as a function of wind speed.

A stability ratio of pounds of ballast/stanchion illustrating the recommended setup configuration for various site conditions is provided in FIG. 4 measured using a 5.5 ft tall by 10 ft wide fabric without perforations wherein the wind speed of stability is indicated. As would be realized, wind can be ambient wind and induced wind wherein ambient wind is defined herein as natural atmospheric wind and induced wind is defined herein as wind emanating from sources other than atmospheric wind such as a vehicle passing by the system with neither being under the control of the user. The ambient and induced wind may be subtractive or additive and therefore the system must be suitable to sustain winds higher than either ambient or induced wind taken alone as the sum of the two must be sustained. The system must be stable with at least 80 MPH winds and preferably at least 90 MPH winds. As realized from a review of FIG. 4, the stability ratio, or pounds of ballast per stanchion, of at least 5 to 30 measured with a 5.5 ft tall by 10 ft wide fabric without perforations, and without a bungee attachment, allows for stability at a wind speed of 25 MPH to 90 MPH. More preferably the stability ratio is at least 10 to no more than 25 as this allows for stability in a wind of at least 30 MPH to 85 MPH yet the weight is not excessive. At a stability ratio above about the weight of the device is unacceptable for rapid deployment. A stability ratio of at least 15 to no more than 25 is the optimum balance of wind stability and weight. One of skill in the art could adjust the stability ratio for a fabric with different dimensions based on the teachings herein. A bungee attachment extends the stability ratio.

Many features of the invention make it usable in various field conditions. It easily sets up in preferably less than one minute, with all needed parts attached to the stanchion for a fast and easy set-up. Optionally, the system includes an attachment, preferably a magnetic attachment, that can be attached to the top of the stanchion for added security. The stanchion is preferably made of powder coated high grade steel and sturdy aluminum with the flexible extension preferably made of fiberglass or other suitable flexible material. The concealment tarp, or flexible fabric, is preferably made from a durable UV stable material that will last for years. The system can be deployed on level or uneven ground by adjusting the length of the stanchion legs. A special stanchion annulus design allows for sand or other removable ballast to be added for extra stability in windy conditions.

The present invention will be described with reference to the figures which are an integral, but non-limiting, part of the instant specification. Throughout the description similar elements will be numbered accordingly.

Figure 1:
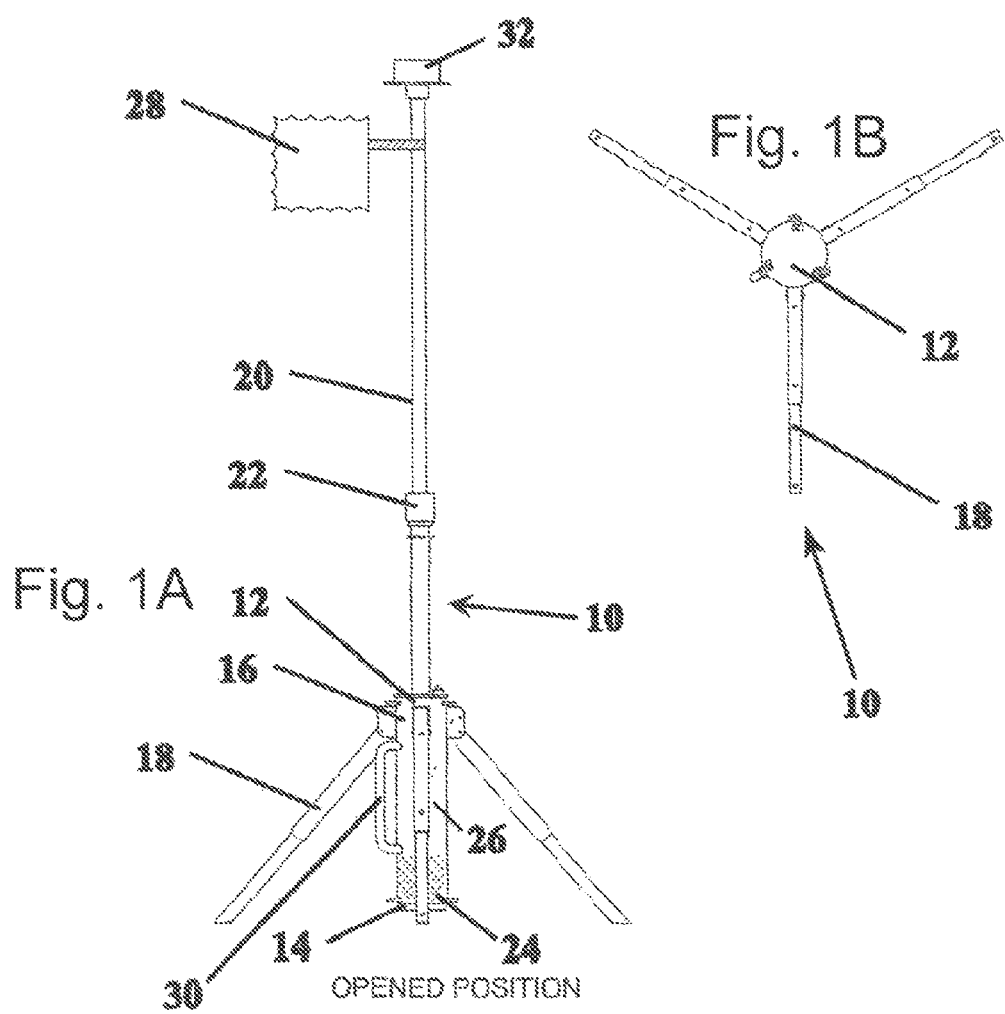
FIGS. 1A and 1B are schematic side and top views of the stanchion in the deployed or open position.

An embodiment of the invention is shown in FIGS. 1A and 1B. Each stanchion 10 has a base 12 having a bottom section 14 and top section 16. At least three adjustable length legs 18 are rotatably disposed to the top section 16 of the base 12. A telescoping vertical extension 20 is slidingly disposed in the base 12. At least one handle 30 provides a means for holding and carrying the stanchion. The vertical extension 20 comprises a flexible material portion that is locked in the extended position using a twist collar 22. Ballast 24 is removably disposed inside a stanchion annulus 26 located between the outer casing of the base 12 and the telescoping vertical extension 20 housing. The ballast can also be disposed in the void of the base 12 created when the flexible extension 20 is deployed. When the stanchion 10 is deployed in an open position with the legs 18 extended, the base 12 is slightly elevated above ground. It is preferable that the base is not in contact with the ground and therefore it is preferable that the base be at least one inch above a plane parallel to the bottom of the legs, also referred to as the feet, to allow for uneven ground. It is more preferable that the base be at least 2 inches above a plane parallel to the bottom of the feet to no more than 5 inches thereby avoiding destabilizing ground contact by the base 12. Above about 5 inches the higher center of mass decreases the stability. This clearance provides extra flexibility and stability in the stanchion 10 assembly to accommodate heavy wind shear by transmitting resultant dynamic loads to the ground only through the adjustable legs 18. An attachment 32 attached to the stanchion is provided in an embodiment wherein the attachment is preferably attached to the top of the vertical extension since this allows the vertical extension to be lowered while the attachment remains in place. In the open position the total height, as measured from a plane parallel to the bottom of the feet to the top of the vertical extension, is at least 60 inches to no more than 80 inches. Below about 60 inches a passing motorist may be able to see over the barrier thereby defeating the advantage offered thereby. Above about 80 inches the wind resistance is compromised. It is preferable that the total height is about 70 inches to about 78 inches. The flexible fabric, 28, is shown in partial view in FIG. 1A wherein the flexible fabric is attached to the stanchion in multiple locations, as illustrated elsewhere herein, by a bungee cord and preferably a bungee cord with a ball are suitable for demonstration of the invention. A 6 inch bungee with a 3 inch ball is widely commercially available from many sources. Bungee cords are well known, and widely commercially available, as a series of linear rubber straps preferably wrapped in a stretchable, or extendable, cloth shell.

Figure 2:
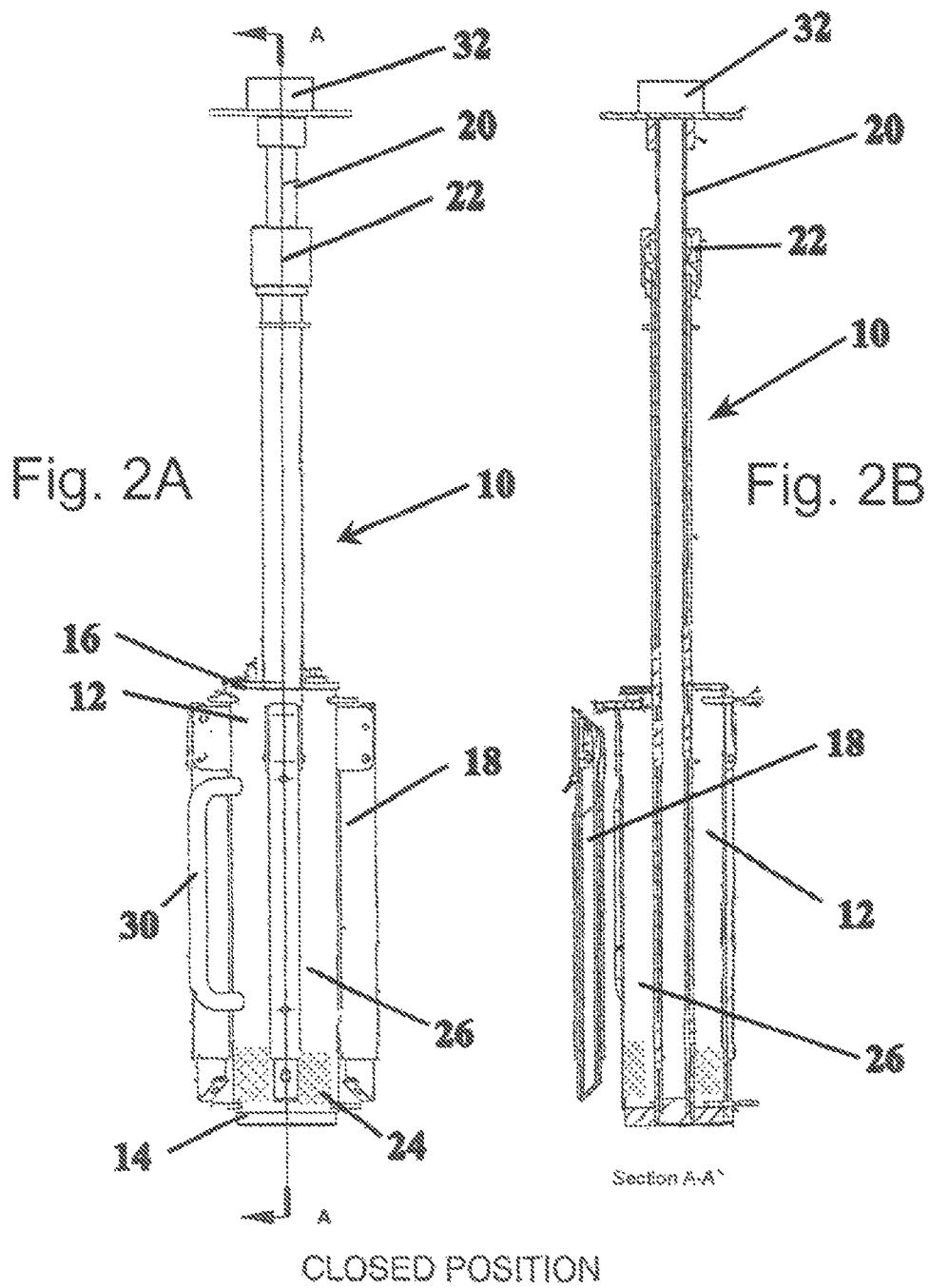
FIGS. 2A and 2B are schematic side views of the stanchion in a closed position.

FIGS. 2A and 2B show an embodiment of the invention in the closed position, having a preferred total closed length of at least 20 inches to no more than 55 inches. Below about 20 inches the space available for sufficient ballast material is compromised unless the diameter is increased to an undesirable size. Above about 55 inches the ability to store the device is compromised. A closed length of about 40 to 46 inches is preferred with approximately 43 inches being particularly suitable for convenient storage.

Figure 3:
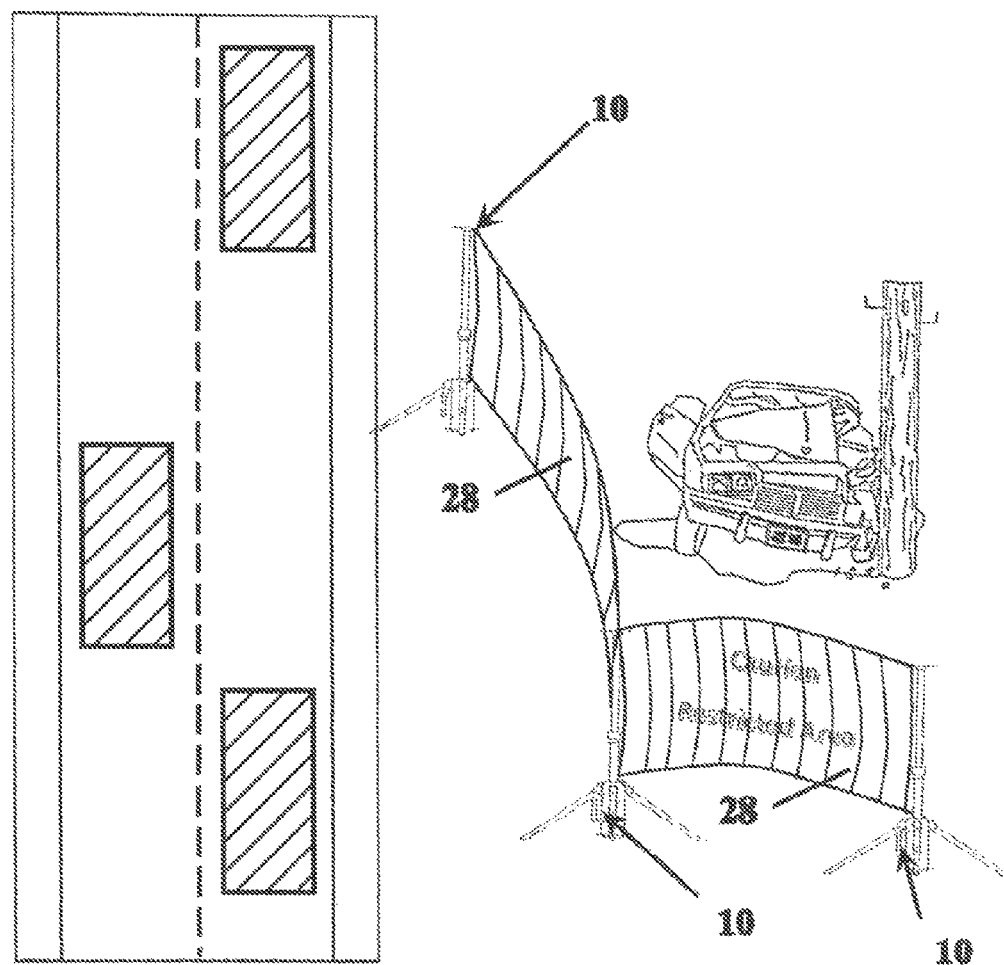
FIG. 3 is a schematic view of the portable incident screen system deployed at an accident scene.

FIG. 3 is a schematic representation of an embodiment of the portable incident screen system invention deployed at an accident scene with two sections deployed. Multiple sections of the invention can be flexibly arranged at the accident scene to block visibility of passing vehicles and accommodate emergency vehicles and personnel. The concealment tarp, or flexible fabric 28, is shown in multiple sections, preferably without perforations, and can be made from a durable UV stable material that will last for years. Emergency signage can be added or printed on the fabric to better define access barriers and potential dangers.

The ballast material is chosen to be readily available, relatively high density and flowable to the extent it can be poured into, and out of, the annulus. Sand is a particularly suitable ballast due to the favorable density, low cost, and it is commonly available on rescue vehicles. Water, though less favorable can be employed, particularly, in low wind environments. Dirt can be employed as it is typically readily available in roadside situations and the dirt can be employed and returned thereby eliminating the need to carry a ballast material.

The accessory is preferably attached to the stanchion and preferably at the upper extent of the vertical extension where it is most visible and most preferably on top of the vertical extension. The accessory can be attached by any method with a clamp or magnetic attachment being most preferred. The accessory is preferably a beacon, such as a light beacon, which can function as a warning signal or to aid in visibility such as a work light for night-time use. The accessory may also be a communication beacon suitable to provide a location such as to air rescue support.

While there has been shown and described what are at present considered the preferred embodiments of the invention, it will be obvious to those skilled in the art that various changes and modifications can be made therein without departing from the scope.

The invention claimed is:

1. A portable traffic incident screen system comprising:
   at least two stanchions, each stanchion further comprising:
   a base having an annulus therein, a bottom section, a top section and wherein as deployed said base is elevated above ground and wherein at least one said base is elevated from a plane parallel to a bottom of the legs by at least 1 inch to no more than 5 inches;
   at least three adjustable length legs rotatably attached to said top section of said base;
   a telescoping vertical extension slidingly disposed in said base wherein said vertical extension further comprises a flexible material portion;
   a ballast removably disposed in said annulus of at least one said base and said ballast is between said adjustable length legs;
   flexible fabric removably disposed between said at least two stanchions; and
   wherein said system has a stability ratio of more than 0 to no more than 30 pounds per stanchion.

2. The portable traffic incident screen system of claim 1 further comprising at least one handle.

3. The portable traffic incident screen system of claim 1 wherein said ballast is selected from the group consisting of sand, water and dirt.

4. The portable traffic incident screen system of claim 1 further comprising an accessory attached to at least one said stanchion.

5. The portable traffic incident screen system of claim 4 wherein said accessory is a beacon.

6. The portable traffic incident screen system of claim 4 wherein said accessory is attached to said vertical extension.

7. The portable traffic incident screen system of claim 4 wherein said accessory is attached by a magnet.

8. The portable traffic incident screen system of claim 1 wherein said stability ratio is at least 5 to no more than 25.

9. The portable traffic incident screen system of claim 1 wherein said flexible fabric is removably attached to at least one said stanchion by at least one bungee cord.

10. A portable traffic incident screen system comprising:
    at least two stanchions, each stanchion further comprising:
    a base having an annulus therein, a bottom section a top section wherein as deployed said base is elevated above ground and wherein at least one said base is elevated from a plane parallel to a bottom of the legs by at least 1 inch to no more than 5 inches;
    at least three adjustable length legs rotatably attached to the top section of said base;
    a telescoping vertical extension slidingly disposed in said base wherein said vertical extension further comprises a flexible material portion;
    a ballast removably disposed in said annulus of at least one said base and said ballast is between said adjustable length legs;
    flexible fabric removably disposed between said at least two stanchions; and wherein when deployed said base is elevated from a plane parallel to a bottom of the legs.

11. The portable traffic incident screen system of claim 10 wherein when deployed said system has a stability ratio of more than 0 to no more than 30 pounds per stanchion.

12. The portable traffic incident screen system of claim 11 wherein said stability ratio is more than 5 to no more than 25.

13. The portable traffic incident screen system of claim 10 wherein said ballast is selected from the group consisting of sand, water and dirt.

14. The portable traffic incident screen system of claim 10 further comprising an accessory attached to at least one said stanchion.

15. The portable traffic incident screen system of claim 14 wherein said accessory is a beacon.

16. The portable traffic incident screen system of claim 14 wherein said accessory is attached to said vertical extension.

17. The portable traffic incident screen system of claim 15 wherein said accessory is attached by a magnet.

* * * * *